H. CLARK.
CLEVIS.
APPLICATION FILED APR. 23, 1915.

1,163,215.  Patented Dec. 7, 1915.

Witnesses  H. Clark  Inventor
by  Attorneys

UNITED STATES PATENT OFFICE.

HAIRRISON CLARK, OF INMAN, VIRGINIA.

CLEVIS.

1,163,215.   Specification of Letters Patent.   Patented Dec. 7, 1915.

Application filed April 23, 1915. Serial No. 23,426.

*To all whom it may concern:*

Be it known that I, HAIRRISON CLARK, a citizen of the United States, residing at Inman, in the county of Wise and State of Virginia, have invented a new and useful Clevis, of which the following is a specification.

The present invention appertains to clevises, and aims to provide a novel and improved clevis for use on plow beams, whereby the whiffle-tree may be attached to the plow beam in a convenient and efficient manner, so that the whiffle-tree may be shifted to either side of the beam in order that the horse or draft animal may walk in the furrow previously made instead of on the unplowed soil.

It is also the object of the invention to provide a clevis of unique construction, whereby the same is convenient, practical and efficient in use, and otherwise of advantage.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1:
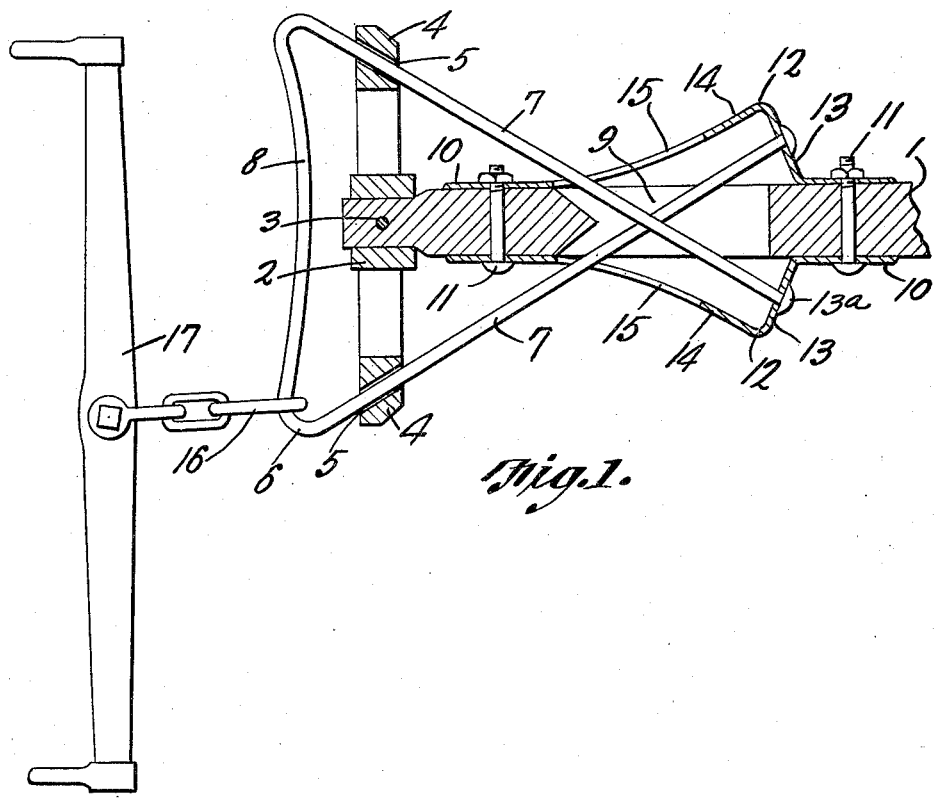
Figure 2:
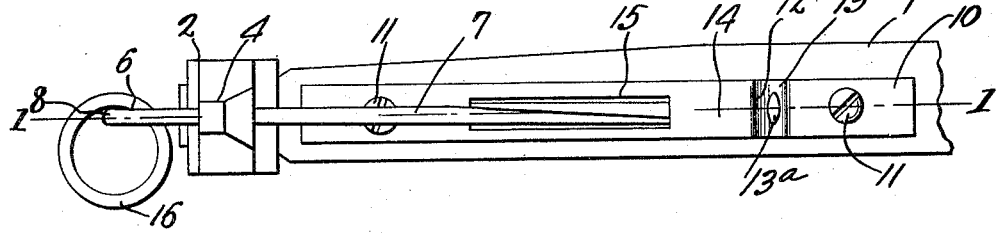

Figure 1 is a horizontal section of the device applied to a plow beam, the section being taken on the line 1—1 of Fig. 2. Fig. 2 is a side elevation of the device.

In carrying out the invention, a member 2 is secured upon the forward end of the plow beam 1, by means of a pin or securing element 3, and is provided with laterally projecting arms 4, projecting in opposite directions. The arms 4 are provided adjacent their free or remote ends with diagonal or oblique apertures or bores 5.

A rod 6, which forms the main portion of the clevis, is bent to provide the crossed portions 7 and a curved yoke 8 connecting the forward ends of the portions 7, the portions 7 extending through the apertures 5 whereby the yoke or portion 8 will be disposed transversely in front of the forward end of the beam 1. The beam 1 is provided with a longitudinal slot 9 extending from one side of the beam to the other, and through which the crossed portions 7 extend to the opposite sides of the beam.

As a means for anchoring the rear ends of the portions 7 to the beam 1, a pair of bars 10 are secured to the opposite sides of the beam 1, suitable bolts or securing elements 11 being engaged through the ends of the bars 10 beyond the opposite ends of the slot 9, and engaging through the beam 1 to clamp the ends of the bars 10 against the beam. The intermediate portions of the bars 10 are bent outwardly away from the beam 1, to provide the V-shaped portions or braces 12, and the rear ends of the portions 7, or the ends of the bar 6, are riveted or otherwise engaged through the rear arms 13 of the braces 12, as at 13ª. The forward arms 14 of the braces 12 are provided with elongated slots 15 through which the portions 7 extend.

A ring 16 is movable upon the yoke or portion 8 of the rod 6, and is adapted to have connected thereto the whiffle-tree 17.

The present clevis may be readily applied to various plow beams, for the convenient and effective attachment of the whiffle-tree 17 with the beam of any suitable plow structure. The whiffle-tree 17 may be readily shifted to one side or the other and when moved to one side of the beam 1 will cause the ring 16 to engage the bend between the yoke 8 and respective portion 7 of the rod 6, whereby the draft will be properly transmitted between the whiffle-tree and beam. The yoke 8 being curved or bowed prevents the ring 16 from sliding accidentally across the yoke 8 during the time that the draft animal is pulling the beam, although when the parts are slackened, the whiffle-tree 17 may be readily shifted to the opposite side when desired or necessary. It is thus possible to shift the whiffle-tree to the proper side of the beam 1, whereby the horse or draft animal may walk in the furrow previously made and this will eliminate the necessity of the horse packing or trodding the soil in advance of the plow. The present clevis is thoroughly substantial in construction, and is desirable and convenient in use. The member 2 having the arms 4 with which the portions 7 of the rod are engaged, and the braces 12 to which the rear ends of the rod are engaged, serve to attach the rod in a thoroughly rigid and efficient manner to the beam. The other advantages and capabilities of the invention are thought to be obvious from the foregoing taken in connection with the drawing without further comment being necessary.

Having thus described the invention, what is claimed as new is:—

The combination with a plow beam having a slot, of a member engaged to the end of the beam and having oppositely projecting arms, a rod having crossed portions extending through said slot, said portions being engaged through said arms, said rod having a curved yoke between the forward ends of said portions, and a pair of V-shaped braces terminally secured to opposite sides of the beam at the ends of said slot, the rear ends of said portions being engaged to certain arms of said braces, and the other arms of the braces having slots through which said portions extend.

In testimony that I claim the foregoing as my own, I have hereto affixed my signature in the presence of two witnesses.

HAIRRISON CLARK.

Witnesses:
  G. W. BENTLEY,
  W. L. MAINONS.

Copies of this patent may be obtained for five cents each, by addressing the "Commissioner of Patents, Washington, D. C."